Patented Nov. 25, 1952

2,619,509

UNITED STATES PATENT OFFICE 2,619,509

PRETREATMENT OF CUMENE BY OXIDATION

George G. Joris, Convent, N. J., assignor to Allied Chemical & Dye Corporation, New York, N. Y., a corporation of New York No Drawing. Application July 19, 1949, Serial No. 105,651

4 Claims. (Cl. 260—610)

This invention relates to liquid phase oxidation of cumene by elemental oxygen, particularly by oxygen of air, to produce cumene hydroperoxide as major product.

Oxidations of cumene by air, or elemental oxygen in other form, under temperature and other conditions suitable for production of cumene hydroperoxide as major product are subject to induction periods of duration varying from one sample to the next and often amounting to many hours during which no reaction occurs, or reaction is extremely slow, although the necessary conditions for oxidation to cumene hydroperoxide are maintained. Particularly at relatively low temperatures, lengthy induction periods are observed. The observed irregularities in the lengths of the induction periods indicate the induction periods may be due to traces of impurities occurring in cumene samples.

Moreover different cumene samples give different rates of oxidation to cumene hydroperoxide even under identical conditions of temperature, air flow, stirring, etc. and even when identical pretreating agents, such as aqueous sodium hydroxide solution, and identical conditioning agents such as solid sodium bicarbonate, solid sodium carbonate, etc. are employed in accordance with my copending applications, Serial No. 105,647, filed July 19, 1949, Serial No. 105,648, filed July 19, 1949, now Patent 2,577,768, and Serial No. 105,649, filed July 19, 1949, now abandoned.

In accordance with the present invention, I pretreat cumene which is to be oxidized to cumene hydroperoxide by intimately contacting the cumene in liquid phase with air, or other form of elemental oxygen, at temperatures between about 100° and about 130° C. until not more than 5 percent by weight of the reaction mixture, preferably about 0.5%, of cumene hydroperoxide has been formed. I next contact cumene thus treated with a strong base; and I then separate cumene from the strong base.

Cumene pretreated as above described shows practically no induction periods in oxidation to cumene hydroperoxide even at relatively low temperatures below 90° C. Pretreated cumene samples also show much smaller deviation from optimum with respect to rates of oxidation to cumene hydroperoxide than do cumene samples which have not been subjected to the above-specified treatment.

The following examples are illustrative of my invention but are not to be interpreted as limiting the same.

*Example 1(a)*.—Liquid cumene maintained at about 110° C. was contacted with air, by bubbling air through the cumene at a rate of 35 liters of air per hour per liter of cumene, for 50 minutes. Cumene so treated was washed by shaking with one normal aqueous potassium hydroxide solution and was then separated from the potassium hydroxide layer.

To cumene thus pretreated there were added 6 grams of finely divided sodium carbonate per 100 cc. of cumene. The stirred reaction mixture was maintained at temperatures about 110° C., and the sodium carbonate was kept in suspension therein by bubbling air through at a rate of 10 liters per hour per 100 cc. of reaction mixture.

The air flow was stopped and the reaction vessel was allowed to cool after 6.5 hours. The concentration of cumene hydroperoxide in the reaction products was 11.5 weight percent, corresponding to an oxidation rate forming in the reaction mixture 1.77 weight percent of cumene hydroperoxide per hour. The yield of cumene hydroperoxide based on unrecovered cumene was about 90% of theory.

(b) Preliminary oxidation as in part (a) above of cumene from the same lot as employed for part (a) of this example was continued 150 minutes instead of 50 minutes.

Oxidation of the cumene thus treated in presence of 2 grams of sodium carbonate per 100 cc. of cumene, carried out as above and continued for 6 hours, gave a final cumene hydroperoxide concentration of 11.2 weight percent in the reaction products, corresponding to an oxidation rate forming in the reaction mixture 1.86 weight percent of cumene hydroperoxide per hour. The yield of cumene hydroperoxide based on unrecovered cumene was as in part (a), i. e. about 90% of theory.

(c) When cumene pretreated as in part (b) above was oxidized at about 100° C. under the same conditions otherwise as in part (b) for 19.5 hours, the final concentration of cumene hydroperoxide in the reaction products was 30.5%, which corresponds to an oxidation rate forming in the reaction mixture 1.56 weight percent of cumene hydroperoxide per hour. The yield of cumene hydroperoxide was about 90% of theory based on unrecovered cumene.

When preliminary treatment with air is omitted, cumene samples frequently show relatively slow oxidation rates to cumene hydroperoxide as compared to the rates shown by samples from the same batch which have been treated with oxygen and then with a base as above described.

*Example 2.*—Samples of cumene were oxidized under identical experimental conditions. One sample was unoxidized cumene recovered from previous operations. A second sample came from the same batch of recovered unoxidized cumene and had been shaken with 1N aqueous sodium hydroxide and then separated. A third sample came from the same batch of recovered unoxidized cumene and had been oxidized for 2 hours at 110° C., treated at room temperature with 1N aqueous sodium hydroxide and then separated. The experimental conditions were the following: temperature of oxidation 90° C.; 7.5 grams of soda ash per 100 cc. of cumene; mechanical stirring; air flow of 10 liters per hour per 100 cc. of cumene.

After 72 hours of continuous operation, no hydroperoxide was formed in samples 1 and 2; but sample 3 formed, upon oxidation under the above conditions for 39 hours, 36.8 weight percent of cumene hydroperoxide in the reaction mixture (i. e. an average of 0.94 gram cumene by hydroperoxide per hour). The molar yield of cumene hydroperoxide based on unrecovered cumene was about 89% of theory.

This last example illustrates the fact that my peroxidizing treatment is of great value for cumene all or part of which is cumene unoxidized in previous cumene hydroperoxide production operations.

In the above examples, cumene was contacted, after preliminary treatment with air, with a dilute potassium hydroxide or sodium hydroxide solution. Other strong bases have like action to potassium and sodium hydroxide, including alkaline earth metal hydroxides, e. g. calcium hydroxides; and other strong bases which are preferably soluble in water and relatively insoluble in cumene. These bases need not necessarily be in the form of dilute aqueous solutions, but may instead be in the form of concentrated solution, or in solid form. Thus, for example, an amine is suitably used in the form of an ion exchange resin.

Stopping preoxidizing pretreatment at a particular time is not essential since attack by oxygen on the cumene itself is slow, especially before treatment of the preoxidized cumene with a base. The extent of cumene hydroperoxide formation is usually a satisfactory gauge of time for preoxidizing treatment; the cumene hydroperoxide formed in this phase of operations should be kept below 5 percent by weight of the reaction mixture and normally is about 0.5% by weight of the reaction mixture.

Conditioning agents such as the sodium carbonate shown in the above examples are useful during final oxidation to promote high yields of cumene hydroperoxide on unreacted cumene. Sodium carbonate in particular is effective at oxidation temperatures above 90° C., e. g. from above 90° to 130° C.

Cumene specimens, and in particular cumene which has been separated from the cumene hydroperoxide formed in the final oxidation or from cumene hydroperoxide decomposition products for recycling, may contain traces of phenol or other acidic impurities which inhibit oxidation even at temperatures between 100° and 130° C. It may thus be desirable to treat the cumene with alkali as described in copending application Serial No. 105,647, filed simultaneously herewith, prior to the pre-oxidation at high temperature in order to remove such acidic impurities so as to permit effective pre-oxidation.

I claim:

1. A process for accelerating oxidation of cumene in liquid phase by elemental oxygen to cumene hydroperoxide as major product, which comprises intimately contacting cumene in liquid phase with elemental oxygen at temperatures between about 100° and about 130° C., until not more than 5%, by weight of the reaction mixture, of cumene hydroperoxide has been formed; then contacting cumene thus treated with a strong base; and separating cumene from the strong base; and thereafter oxidizing cumene, thus treated, in liquid phase with elemental oxygen at temperatures not above about 110° C. until the cumene hydroperoxide concentration in the reaction products is at least about 11 weight percent.

2. Process as defined in claim 1, wherein air is employed to supply elemental oxygen for pretreating cumene.

3. Process wherein cumene pretreated in accordance with claim 1 is cumene unoxidized in previous cumene hydroperoxide operations.

4. Process as defined in claim 1 wherein air is employed to supply elemental oxygen for pretreating cumene and the step of contacting the oxygen-treated cumene with a strong base is performed by washing said cumene with aqueous sodium hydroxide solution.

GEORGE G. JORIS.

REFERENCES CITED

The following references are of record in the file of this patent:

UNITED STATES PATENTS

| Number | Name | Date |
|---|---|---|
| 2,430,864 | Farkas et al. | Nov. 18, 1947 |
| 2,447,794 | Brewer | Aug. 24, 1948 |
| 2,497,349 | Farkas et al. | Feb. 14, 1950 |
| 2,552,016 | Denison et al. | Sept. 12, 1950 |

FOREIGN PATENTS

| Number | Country | Date |
|---|---|---|
| 610,293 | Great Britain | Oct. 13, 1948 |

OTHER REFERENCES

Hock et al., Ber., vol. 77, pp. 253–264 (1944).